United States Patent Office 3,308,181
Patented Mar. 7, 1967

3,308,181
OXIDATIVE DEHYDROGENATION WITH
ADDED HYDROGEN
Emory W. Pitzer, Bartlesville, Okla., assignor to Phillips
Petroleum Company, a corporation of Delaware
No Drawing. Filed Nov. 4, 1963, Ser. No. 321,361
6 Claims. (Cl. 260—680)

This invention relates to oxidative dehydrogenation. In one aspect the invention relates to a method for improving the selectivity of a process for the dehydrogenation of an organic compound.

The catalytic dehydrogenation of paraffins to olefins and/or diolefins and of olefins to diolefins is very important commercially because of the great demand for the olefins and/or diolefins produced for use in the manufacture of plastics, synthetic rubbers and the like. However, it has been found that in current commercial practice a conversion ceiling is imposed by (1) the thermodynamics of the reaction at practical operating temperatures and pressures, and (2) by the fact that the reaction is highly endothermic and, therefore, it is difficult to get sufficient heat into the catalyst in the dehydrogenation zone during the reaction to maintain the desired conversion. Efforts have been made to circumvent the first limitation by operating at a lower pressure with a diluent present to reduce the partial pressure of the hydrocarbon or by the addition of oxygen which is a hydrogen acceptor. Efforts have been made to circumvent the second limitation by using small-diameter catalyst tubes which can be heated externally, by adding superheated steam to the hydrocarbon feed or by addition of oxygen to the feed to react exothermically with hydrogen formed during the reaction and thus supply at least part of the needed heat for the reaction. It is readily apparent that the addition of oxygen would be expected to raise the conversion ceiling by at least a partial removal of both limitations. However, attempts to effect hydrocarbon dehydrogenation in the presence of oxygen have detrimentally affected the selectivity of the dehydrogenation reaction because of preferential reaction of the oxygen with the hydrocarbon with the resultant lower selectivity of reaction to desired products.

It is an object of the invention to provide an improved catalytic process for oxidation dehydrogenation of organic compounds.

Yet another object of the invention is to provide an improved catalytic process for producing olefins by oxidative dehydrogenation of organic compounds wherein an improved selectivity is obtained.

Still another object is to provide an improved catalytic process for the oxidative dehydrogenation of olefins to diolefins.

These and other objects of the invention will be readily apparent to those skilled in the art from the accompanying disclosure and appended claims.

These objects are broadly accomplished in a catalytic process for the dehydrogenation of organic compounds in the presence of oxygen by introducing the organic compound into the dehydrogenation zone in the initial presence of hydrogen.

It has now been found that the addition of hydrogen to the oxygen-containing hydrocarbon feed makes possible the higher conversion ceiling effected by the presence of the oxygen and also results in a higher selectivity of reaction to desired products. Although the invention is not to be limited by any mechanism, it appears that with no hydrogen present in the oxygen-containing hydrocarbon feed the oxygen can react with the hydrocarbon in the first portion of the catalyst bed where dehydrogenation has not proceeded far enough to provide hydrogen for reaction with the oxygen. With hydrogen present in the oxygen-containing hydrocarbon feed the zone of low hydrogen content is eliminated, the oxygen reacts with the hydrogen throughout the bed and the selectivity of reaction is improved.

The mechanism of the catalytic dehydrogenation of paraffins to the corresponding olefins differs considerably from that of the thermal decomposition of paraffins to produce olefins. In the former reaction the principal reaction (using normal butane as exemplary of the paraffin hydrocarbons) is:

$$n\text{—}C_4H_{10} = n\text{—}C_4H_8 + H_2 \tag{1}$$

with only a small fraction of the normal butane reacting to give methane plus propylene or ethane plus ethylene. When oxygen is present during the catalytic dehydrogenation reaction, its principal function is to react with the hydrogen formed in reaction (1), thus driving the reaction more nearly to completion. Because the hydrogen-oxygen reaction is exothermic, there is the additional beneficial effect of supplying heat for the highly endothermic dehydrogenation reaction.

In contrast, as is discussed in The Pyrolysis of Carbon Compounds by Hurd (Reinhold, New York City, 1929), on pages 68 and 69, the thermal decomposition of normal butane proceeds principally by the reactions:

$$n\text{—}C_4H_{10} = CH_4 + C_3H_6 \tag{2}$$

and $$n\text{—}C_4H_{10} = C_2H_6 + C_2H_4 \tag{3}$$

with only a small fraction of the normal butane reacting to give n-butenes plus hydrogen. Nitrogen and hydrogen are inert diluents in the thermal decomposition reaction. When oxygen is present during the thermal decomposition reaction, it will necessarily react principally with either the paraffins or olefins because there is very little hydrogen with which it can react. By these exothermic reactions it will thus furnish heat for the endothermic thermal decomposition of normal butane, but only at the expense of some of the olefins formed.

Hydrogen addition during catalytic oxidative dehydrogenation, i.e., the process of my invention, prevents destruction of the butane in the small increment of the catalyst bed before sufficient hydrogen is formed by reaction (1) to react with oxygen present. Hydrogen added during non-catalytic oxidative dehydrogenation serves mainly as an inert diluent, as indicated by Hurd.

The invention is broadly applicable to the dehydrogenation of organic compounds in the presence of a catalyst and oxygen. The invention is particularly applicable to the catalytic dehydrogenation of paraffins and mixtures thereof, to the dehydrogenation of olefins and mixtures thereof, to the dehydrogenation of mixtures of of paraffins and olefins, to the dehydrogenation of cycloalkyl or substituted cycloalkyl compounds and to the dehydrogenation of alkyl or cycloalkyl substituents on aromatic or heterocyclic nuclei.

The catalytic, oxidative dehydrogenation process is particularly applicable to those saturated organic compounds which have 2 to 20 carbon atoms per molecule and which are readily vaporized at temperatures in the approximate range of 600 to 1800° F. Specific compounds which can be dehydrogenated effectively include saturated aliphatic compounds such as ethane, normal butane, normal pentane, isopentane, 3-methylhexane, 2-methylpentane, normal octane, normal dodecane, normal eicosane, and the like. Cycloparaffins such as cyclopentane, cyclohexane and decahydronaphthalene and substituted cycloparaffins such as alkyl-substituted cycloparaffins, for example methylcyclopentane and methylcyclohexane, are also advantageously employed.

Monoolefins most commonly employed in the production of diolefins are butenes and pentenes to form butadiene and pentadiene, respectively. Other important charge stocks and their products include ethylbenzene to styrene, 2-methylbutene to isoprene, and 2-methyl-5-ethylpyridine to 2-methyl-5-vinylpyridine. The process is applicable generally to monoolefins and to alkyl-substituted aromatic and heterocyclic compounds, and particularly to monoolefins having 8 or less carbon atoms and alkylbenzenes or alkylpyridines with 1 to 4 alkyl groups each having 6 or less carbon atoms with at least one alkyl group of 2 or more carbon atoms. Both selectivity and yield of desired product is high for these specific compounds.

For example, the olefin dehydrogenation process is ordinarily carried out by forming a preheated mixture of the dehydrogenatable material and a diluent such as steam, passing this mixture over the catalyst at the desired temperature and recovering the product from the reaction mixture coming from the catalyst cases. Recycle of the unconverted charge is utilized in substantially all applications. The catalyst chambers may be adiabatic or isothermal, although isothermal reactors are more desirable from a processing point of view.

It will be understood by those skilled in the art that over-all yield per pass of butadiene or other dehydrogenation product is the product of the conversion and the selectivity. The term "yield" as used herein refers to yield per pass of product. In general, the operating conditions of temperature, space velocity, etc. will be chosen to obtain a conversion consistent with economic considerations. It is readily apparent that at higher conversion levels less separation and recycle of dehydrogenatable feed are required. Inasmuch as conversion and selectivity are inversely related under a given set of conditions, i.e. as conversion level is increased selectivity decreases, the choice of a conversion level is dictated by the destruction of feed that can be tolerated. Therefore, any means that permits operating at a higher conversion level with the same selectivity or at the same conversion level with a higher selectivity is highly desirable. The process of this invention provides such a means. Having chosen the desired conversion, the greater the selectivity the greater the per-pass yield of desired product.

The catalyst to be employed in the catalyzed dehydrogenation process will depend upon the feed stock and products desired. A particularly suitable catalyst for the dehydrogenation of monoolefins is described in U.S. Patent No. 2,866,790 to Emory W. Pitzer and issued Dec. 30, 1958. In this patent a process is described for the preparation of an iron oxide catalyst containing a small amount of chromium oxide as a stabilizer and a potassium compound as a promoter. Generally these catalysts contain 51.0 to 59.0 percent by weight potassium carbonate, 39.0 to 47.0 percent by weight iron oxide and 1.0 to 10.0 percent by weight chromium oxide.

Numerous methods of preparing this catalyst are available. For example, the catalyst components may be brought together in a mill, such as the hammer mill, and milled to break up the agglomerates to a small size, the milled mixture pelleted and dried, and the catalyst used in the dehydrogenation process. Alternatively, the catalyst components can be formed into a paste with any suitable liquid, such as water or a dilute tannic acid solution and extruded into the desired shape or size. Other methods involving coprecipitation, impregnation, and other known methods may also be used with satisfactory results.

In dehydrogenation processes employing this catalyst the reaction is carried out at a high temperature and preferably in the presence of steam. The temperature is preferably in the range of 1050 to 1300° F. With a temperature much below 1050° F. the conversion falls off rapidly and with temperatures much above 1300° F. the selectivity of the reaction decreases below the usual desirable limit. However, the catalyst can be employed at both lower and higher temperatures than those indicated. The steam diluent is utilized in the amount of 1 to 20 mols of steam per mol of feed, e.g. monoolefin or alkyl aromatic, charged. It is advantageous to maintain a pressure as low as feasible and substantially atmospheric pressure is ordinarily employed. However, elevated pressures are operable.

Although the invention is described herein principally with reference to the dehydrogenation of olefins, specifically n-butene, in the presence of an iron oxide type catalyst hereinbefore described, the invention should not be so limited. Any type of dehydrogenation catalyst active for the dehydrogenation of an organic compound is operable. In addition, other types of inert diluents may be employed, such as nitrogen and carbon dioxide.

Other types of catalyst which may be employed include the chromium oxide-calcium nickel phosphate-type catalyst active for the dehydrogenation of aliphatic monoolefins having at least 4 carbon atoms in a carbon chain containing olefinic linkage, and the chromia-alumina type catalysts such as, for example, those described in U.S. Patent 2,606,159 to James R. Owen and issued Aug. 5, 1952, for the dehydrogenation of organic compounds such as paraffins. A paraffin or olefin having more than 4 carbon atoms in the chain may also be cyclized by contact with a dehydrogenation catalyst, for example hexene-1 may be dehydrocyclized to benzene.

The amount of oxygen employed depends upon the feed, but contents up to at least twice the amount stoichiometrically required for reaction with the hydrogen added plus the hydrogen formed in the reaction are employable.

The hydrogen content of the feed to the reactor should be in the range of 1 to 50 mols per 100 mols of dehydrogenatable feed, preferably 5 to 25 mols per 100 mols.

Although it is preferred to admix the hydrogen with the incoming feed containing the dehydrogenatable material and oxygen, the individual components of the feed can be individually introduced or collectively introduced into the initial portion of the dehydrogenation zone so long as the hydrogen and oxygen are intimately admixed prior to contact with the catalyst.

The invention is best described by reference to the following examples.

EXAMPLE I

Butene-2 was dehydrogenated in the presence or absence of hydrogen and/or oxygen using a catalyst prepared as described in U.S. Patent 2,866,790 and containing 44.6 weight percent $Fe_2O_3$, 52.2 weight percent $K_2CO_3$, and 3.2 weight percent $Cr_2O_3$. The dehydrogenation tests were made at a temperature of 1250° F., a steam-to-hydrocarbon mol ratio of 8.4:1, and a hydrocarbon space velocity of 800 volumes per volume of catalyst per hour.

| Run Number | 1 | 2 | 3 | 4 |
|---|---|---|---|---|
| Added $H_2$, mols/100 mols butene feed | 20 | 0 | 20 | 20 |
| Added $O_2$, mols/100 mols butene feed | 0 | 5 | 5 | 20 |
| Made $CO_2$, mols/100 mols butene feed | 13.0 | 16.3 | 13.6 | 15.9 |
| Net $CO_2$ from $O_2+C_4H_8$ reaction | | 3.3 | 0.6 | 2.9 |
| Expected net $CO_2$[1] | | 3.3 | 3.3 | 13.3 |

[1] Assuming all the oxygen reacted with butene by the reaction: $6O_2+C_4H_8=4CO_2+4H_2O$.

The carbon dioxide made in Run 1 represents the amount formed from the reaction of butene feed with the steam used as diluent. The net amount of carbon dioxide formed by reaction of butene with added oxygen is determined by subtracting the base figure (13.0) from the carbon dioxide made in Runs 2, 3 and 4. In Run 2, without added hydrogen to react with the oxygen in the first portion of the catalyst bed, the net carbon dioxide production is exactly what is expected from the stoichiometric reaction of oxygen and butene. In Runs 3 and 4, with different hydrogen:oxygen ratios, the net carbon dioxide production is only about a fifth the expected production. This means that the added hydrogen is reacting with the oxygen to prevent the butene-oxygen reaction, to furnish heat for the dehydrogenation, to increase the thermodynamic conversion "ceiling," and to increase the selectivity of butadiene formation.

EXAMPLE II

Butene-2 is dehydrogenated using a catalyst and operating conditions similar to those of Example I, with no added hydrogen or oxygen, with 5 mols of oxygen per 100 mols of butene-2, and with 20 mols of hydrogen and 5 mols of oxygen per 100 mols of butene-2 at a conversion level of 30 percent. The selectivity of butadiene formation is decreased from 70 to 65 percent by the addition of oxygen and is increased from 70 to 75 percent by the addition of hydrogen and oxygen.

While certain examples, structures, and composition of process steps have been described for purposes of illustration, the invention is not limited to these. Variation and modification within the scope of the disclosure and the claims can readily be effected by those skilled in the art.

I claim:
1. In a catalytic process for the dehydrogenation of an olefin wherein the olefin is dehydrogenated in a dehydrogenation zone in the presence of a dehydrogenation catalyst consisting essentially of 51.0 to 59.0 percent by weight potassium carbonate, 39.0 to 47.0 percent by weight iron oxide and 1.0 to 10.0 percent by weight chromium oxide, the improvement comprising including hydrogen and from 5 mols of oxygen per 100 mols of said olefin up to twice the amount stoichiometrically required for reaction with the hydrogen added plus hydrogen formed in the reaction with the charge of olefin to said zone.

2. In a catalytic process for the dehydrogenation of an olefin wherein the olefin is dehydrogenated in a dehydrogenation zone in the presence of a dehydrogenation catalyst consisting essentially of 51.0 to 59.0 percent by weight potassium carbonate, 39.0 to 47.0 percent by weight iron oxide and 1.0 to 10.0 percent by weight chromium oxide, the improvement comprising contacting said olefin with the catalyst in the initial presence of hydrogen and from 5 mols of oxygen per 100 mols of said olefin up to twice the amount stoichiometrically required for reaction with the hydrogen added plus the hydrogen formed in the reaction.

3. The process of claim 2 wherein said olefin comprises butene-2.

4. In a catalytic process for the dehydrogenation of a saturated organic compound wherein the organic compound is dehydrogenated in a dehydrogenation zone in the presence of a dehydrogenation catalyst consisting essentially of 51.0 to 59.0 percent by weight potassium carbonate, 39.0 to 47.0 percent by weight iron oxide and 1.0 to 10.0 percent by weight chromium oxide, the improvement comprising including hydrogen and from 5 mols of oxygen per 100 mols of said saturated, organic compound up to twice the amount stoichiometrically required for reaction with the hydrogen added plus the hydrogen formed in the reaction with the charge of organic compound to said zone.

5. A catalytic process for the dehydrogenation of an olefin comprising introducing a mixture of olefin, steam, oxygen and hydrogen into a dehydrogenation zone containing a catalyst consisting essentially of 51.0 to 59.0 percent by weight potassium carbonate, 39.0 to 47.0 percent by weight iron oxide and 1.0 to 10.0 percent by weight chromium oxide, said hydrogen being present in an amount in a range of 1 to 50 mols per 100 mols of olefin and recovering a diolefin product, said oxygen being present in an amount comprising from 5 mols of oxygen per 100 mols of olefin up to twice the amount stoichiometrically required for reaction with the hydrogen added plus the hydrogen formed in the reaction.

6. A catalytic process having improved selectivity for the dehydrogenation of butene-2 to butadiene comprising introducing a butene-2 feed containing 1 to 20 mols of steam and 1 to 50 mols of hydrogen based on butene-2 and from 5 mols of oxygen per 100 mols of butene-2 up to twice the amount stoichiometrically required for reaction with hydrogen added plus the hydrogen formed in said dehydrogenation zone maintained at 1050 to 1300° F. and containing a catalyst consisting esentially of 51.0 to 59.0 percent by weight potassium carbonate, 39.0 to 47.0 percent by weight iron oxide and 1.0 to 10.0 percent by weight chromium oxide and recovering butadiene.

References Cited by the Examiner
UNITED STATES PATENTS

| | | | |
|---|---|---|---|
| 2,866,790 | 12/1958 | Pitzer | 260—680 X |
| 2,945,900 | 7/1960 | Alexander et al. | 260—680 X |
| 3,119,111 | 1/1964 | McDonald et al. | 260—680 |
| 3,161,670 | 12/1964 | Adams et al. | 260—680 X |

PAUL M. COUGHLAN, Jr., *Primary Examiner.*